(12) United States Patent
Wengrovitz et al.

(10) Patent No.: US 8,150,014 B2
(45) Date of Patent: Apr. 3, 2012

(54) SYSTEM AND METHOD FOR TRANSITIONING A VOICE SESSION IN PROGRESS OVER A COMMUNICATION NETWORK INTO A VOICE AND DATA SESSION

(75) Inventors: Michael S. Wengrovitz, Concord, MA (US); Joao Eduardo Castro De Almeida, Manchester, NH (US)

(73) Assignee: Alcatel Lucent, Paris (FR)

( * ) Notice: Subject to any disclaimer, the term of this patent is extended or adjusted under 35 U.S.C. 154(b) by 1270 days.

(21) Appl. No.: 11/279,267

(22) Filed: Apr. 11, 2006

(65) Prior Publication Data

US 2007/0263830 A1  Nov. 15, 2007

(51) Int. Cl.
*H04M 3/42* (2006.01)
(52) U.S. Cl. ............... 379/202.01; 370/352; 379/212.01
(58) Field of Classification Search ............. 379/201.01, 379/225, 202.01, 212.01; 370/352, 397, 370/466, 351
See application file for complete search history.

(56) References Cited

U.S. PATENT DOCUMENTS

| 5,164,982 | A  | * | 11/1992 | Davis ......................... 379/93.17 |
| 5,555,290 | A  | * | 9/1996  | McLeod et al. ............ 379/88.25 |
| 6,389,005 | B1 | * | 5/2002  | Cruickshank ................. 370/352 |
| 7,039,040 | B1 | * | 5/2006  | Burg ............................ 370/352 |
| 2002/0122391 | A1 | * | 9/2002 | Shalit ............................ 370/260 |
| 2003/0026406 | A1 | * | 2/2003 | Ernstrom et al. ......... 379/202.01 |
| 2004/0028212 | A1 | * | 2/2004 | Lok et al. ................. 379/265.09 |
| 2005/0008000 | A1 |   | 1/2005  | Korycki et al. |
| 2006/0285670 | A1 | * | 12/2006 | Chin et al. ............... 379/201.01 |

FOREIGN PATENT DOCUMENTS

| EP | 0721266 A2 | 7/1996 |
| GB | 2357659 A  | 6/2001 |

* cited by examiner

*Primary Examiner* — Ahmad Matar
*Assistant Examiner* — Oleg Asanbayev
(74) *Attorney, Agent, or Firm* — Donald R. Boys; Central Coast Patent Agency, Inc.

(57) ABSTRACT

A system for effecting transition of a private branch exchange (PBX) system-hosted voice only telephone session in progress into a voice session optionally enhanced with a data collaboration channel hosted by a conference bridge includes a call escalation system (CES) application for determining call state of the voice session to be transitioned and for executing a sequence of command requests for effecting the transition based on a trigger event; and a control application server for controlling the PBX switch.

19 Claims, 10 Drawing Sheets

SYSTEM AND METHOD FOR TRANSITIONING A VOICE SESSION IN PROGRESS OVER A COMMUNICATION NETWORK INTO A VOICE AND DATA SESSION

CROSS-REFERENCE TO RELATED APPLICATIONS

Not Applicable.

BACKGROUND OF THE INVENTION

1. Field of the Invention

The present invention is in the field of telephony communications including computer telephony integrated (CTI) systems and relates particularly to methods and apparatus for transitioning a voice-only telephone session to a voice plus data session between at least two active parties.

2. Discussion of the State of the Art

The field of telephony communications has experienced many technological improvements over the recent years relating to computer telephony integration (CTI), multiple party communications, intelligent routing, voice over Internet protocol, and end usability through enhanced features. Seamless bridging between traditional switched telephony and Internet protocol network telephony and accompanying standard protocols has enabled communication sessions and media transfer sessions that encompass end users operating a wide variety of communications devices.

In typical enterprise communication, workers or associates have telephone extension numbers associated with an existing CTI-enabled PBX central office telephony switch. A caller off-hooks a telephone set, dials an extension to place a call and some form of ringing event or notice of the incoming call and alerts the recipient. To answer the call, the recipient off-hooks a telephone set to accept the call. The physical nature of such a call is bi-directional voice over the connections between each set and the PBX.

Recent developments in telephony enable any user having a network-connected personal computer with a video display unit (VDU) running a graphical user interface (PC/GUI) and having a private branch exchange (PBX) telephone set, or public switched telephony network (PSTN)-connected telephone, or a cellular telephone, to initiate a voice and data session with any other users similarly equipped with a PC/GUI connected to the prevailing data network and a telephone. A commercially available system is known to the inventor for achieving such voice and data session capability. The system involves a voice data conference bridge that is leveraged to connect users for bi-directional data sharing over the connected PCs and bi-directional voice using the telephones.

In practice of state-of-art bridging, a user invokes an application on a PC and initiates a session with another party, which is designated as a contact of the user. The PC interfaces with a conference bridge that sets up a call leg to the initiator's telephone. The initiating party's telephone rings and a screen pop-up window is sent to, and is displayed on, the associated PC used to initiate the session. The conference bridge also places a call to a destination telephone, so that at the other end the called party's telephone rings and a screen pop-up window is sent to, and is displayed on, the called party's computer. The latest state-of-art capability known to the inventor also allows for controlling the call legs of the connected telephones through each users' PC interface so that these call legs may be dropped, muted, or placed on hold, and so that additional users may potentially be added to the conference, dropped, muted, and so forth. The state of art system can be used with PSTN telephones, cell phones and with enterprise PBX systems.

A limitation of the prior art system relates to how the call is initiated. Typically, users are accustomed to initiating telephone calls from the dial-pad on their telephone sets, and not from a PC/GUI application. Then, later in the call, users may optionally desire to add data collaboration capabilities. However, the prior art requires the user to have initially placed the call from a PC/GUI. Otherwise, data sharing or collaboration tasks cannot later be achieved. The requirement of initiating the call from a PC can be somewhat awkward for users in the fast paced environments of an enterprise or call center.

Therefore, what is needed in the art is a system and method for seamlessly transitioning conventional telephone voice sessions, initiated from the dial-pad of the telephone set, into a collaboration session involving both voice and data. Such a system and method would streamline collaboration by reducing the task complexity for initiating such sessions.

SUMMARY OF THE INVENTION

A system is provided for effecting transition of a private branch exchange (PBX) system-hosted voice only telephone session in progress into a voice session optionally enhanced with a data collaboration channel hosted by a conference bridge. The system includes a call escalation system (CES) application for determining call state of the voice session to be transitioned and for executing a sequence of command requests for effecting the transition based on a trigger event, and a control application server for controlling the PBX switch.

In one embodiment, the voice only telephone session is in progress between at least 2 PBX telephones at the time of transition. In another embodiment, the voice only session is in progress between at least one PBX telephone and at least one system-external public-switched-telephone-system (PSTN) telephone at the time of transition. In yet another embodiment, the voice only telephone session is in progress between at least 2 PBX telephones hosted by 2 separate PBX systems separated by a wide area network (WAN). In one embodiment, call state includes calling party identification and telephone number or equivalent and called party identification and telephone number or equivalent and time of progression of the current call. In another embodiment, call state further includes address information of a computing device used by the PBX party for data collaboration, the address information determined via a table look up procedure.

In one embodiment, the control application is a computer telephony integration (CTI) application controlling the PBX system. In a preferred embodiment, the trigger event is one of an invocation of a user operable feature or an invocation of an automated feature.

According to another aspect of the present invention, a user operable feature is provided for initiating a request to transfer a voice only telephone session from a PBX switch host to a voice and data conference bridge host. The feature includes a mode button or icon generic to a PBX telephone set or an icon displayed on an associated computing device, and a machine instruction for interpreting and executing the intent of the feature.

In one embodiment, the feature is embodied as a physical mode button on a PBX set and wherein the machine instruction is a CTI/PBX routine for generating a request. In another embodiment, the feature is embodied as an icon displayed on a screen of a PBX set and wherein the machine instruction is a CTI/PBX routine for generating a request. In still another embodiment, the feature is embodied as an icon displayed on the associated computing device and wherein the machine instruction is a CES routine for generating a request.

In one embodiment, the voice only telephone session is in progress between at least 2 PBX telephones at the time of feature invocation, interpretation and execution. In another embodiment, the voice only telephone session is in progress between at least one PBX telephone and at least one PSTN telephone at the time of feature invocation, interpretation, and execution. In one embodiment invocation of the feature, triggers a CTI to CES call, the call including the call state of the parties.

According to yet another aspect of the present invention, a method for triggering a request for transitioning a voice only telephone session to a voice and data conference session is provided. The method includes acts for (a) establishing a voice-only telephone session, and (b) invoking a feature associated with the session. In one aspect of the method, in act (a), the voice only session is between 2 PBX parties. In another aspect of the method, in act (a), the voice only session is between a PBX party and a PSTN party.

In one aspect of the method, in act (b), the feature is invoked by depressing a mode button on a PBX set of a party in session. In another aspect, the feature is invoked by manipulating an icon displayed on a PBX screen of a PBX set of a party in session. In still another aspect, the feature is invoked by manipulating an icon displayed on a personal computer video display unit (PC/VDU) associated with a PBX set of a party in session. In still a further aspect of the method, the feature is automatically invoked through a software routine as a matter of enterprise policy and/or rules base.

BRIEF DESCRIPTION OF THE DRAWING FIGURES

DETAILED DESCRIPTION

Figure 1:
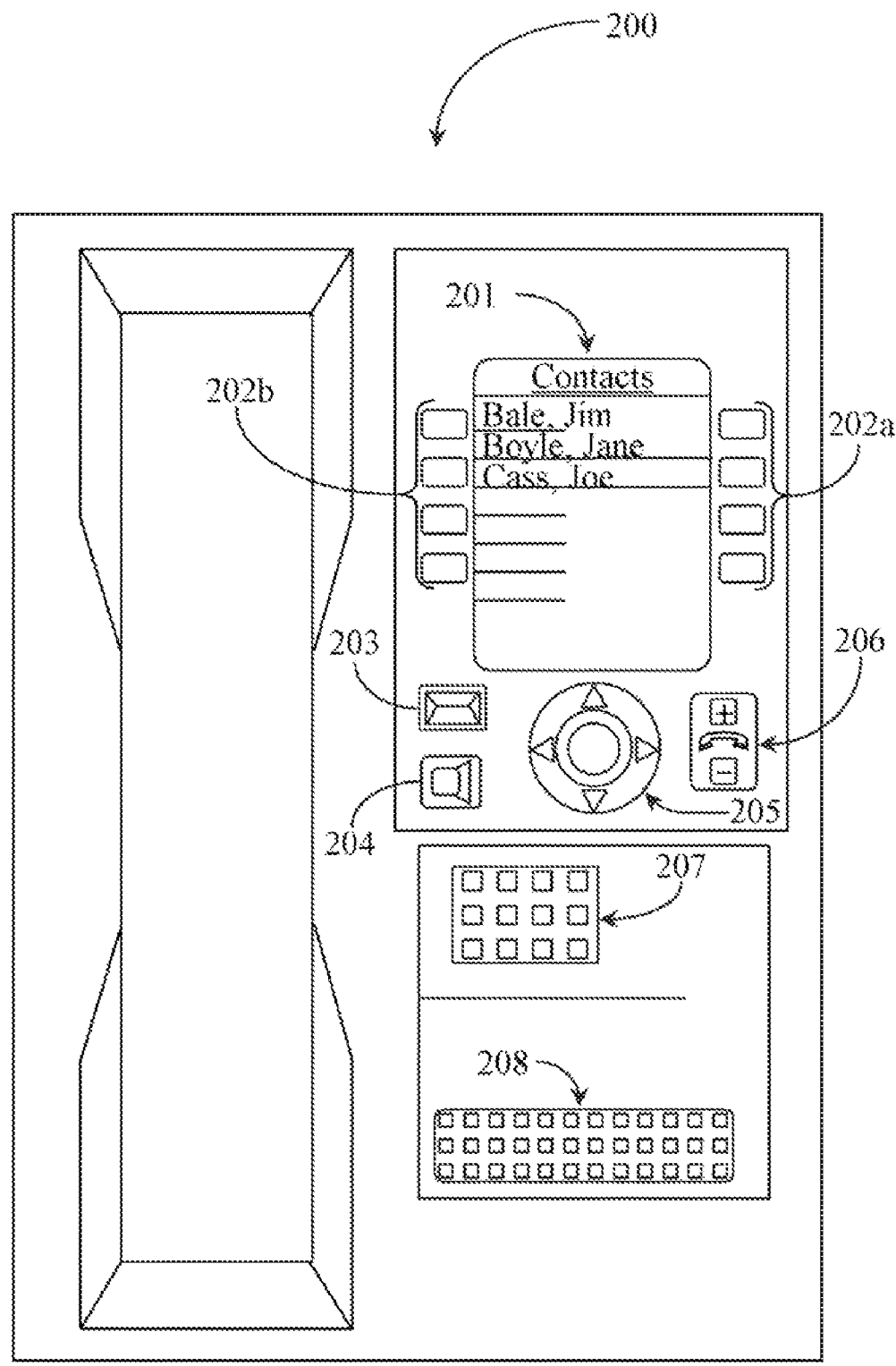
FIG. 1 is a face view of a typical PBX telephone set adapted for voice session to voice/data session call escalation according to an embodiment of the present invention.

FIG. 1 is a plan view of a typical PBX telephone set 200 adapted for voice session to voice/data session call escalation according to an embodiment of the present invention. Set 200 has a display window 201 adapted for displaying such as contacts, contact parameters, an externally maintained directory, or the like. Screen 201 may also display information served to the set from an external LAN-connected server in one embodiment where sets are externally enhanced by a server application. In this example, a voice/data collaboration button is not specifically identified because any of buttons 202a or 202b may be programmed to function as a voice to voice/data call escalation button without departing from the spirit and scope of the present invention.

In one embodiment, PBX set 200 may be connected via telephone wiring to a PBX system that is connected to a LAN or it may be directly connected to a LAN supporting the PBX. The CES in a preferred embodiment must issue CTI commands to answer a new call and release an existing call. The preferred embodiment of the present invention is practice by issuance of CTI commands through the PBX's CTI link. The phone set does not necessarily need to be connected to a LAN. In one embodiment however, CTI commands may be issued to the phone itself and paths to the phone could include a CES-LAN-PC-Phone connection. Exactly how the phone is utilized as a user interface for triggering a call escalation from a voice to a voice/data call is a matter that is separate from the CTI function described above. For a manual call escalation trigger, all that is required is a button or push icon on the set that when invoked connects to a call escalation system. Moreover, any standard programmable button for triggering a call escalation may include a dial tone multiple frequency key press or sequence of presses. Pressing the pound button (#) on the keypad 3 times (###) may trigger a call escalation.

PBX set 200 has a plurality of mode buttons grouped on either side of display screen 201. These are mode buttons 202a and mode buttons 202b. In a preferred embodiment, set 200 is intelligently enhanced using an external server application hosted on the LAN network and the set has connection to the LAN or directly to the PBX system. The LAN connection, if available, does not replace the telephone connection from the set to the PBX switch. In an "intelligent embodiment", mode buttons 202a and 202b are dynamically programmable according to what is served to screen 201 during operation. In this case, only a summary contact list is displayed and only the contact name is visible. However, mode buttons 202a and 202b may already be functional for such as for switching to another list, exiting the current operation, or other functions. A navigation control 205 provides the operator suitable controls for scrolling and highlighting information displayed in screen 201 and for selecting options to expand details.

Other standard features may also include a volume level control interface 206 and a speaker mute button 204. Additional standard features include a manually operated dial pad 207, and a manually operated keyboard 208. PBX set 200 may be enhanced with more or fewer features than those illustrated in this example without departing from the spirit and scope of the present invention. All that is minimally required in order to practice the present invention is that PBX set 200 has connection to a CTI-enhanced PBX switch.

Figure 2:
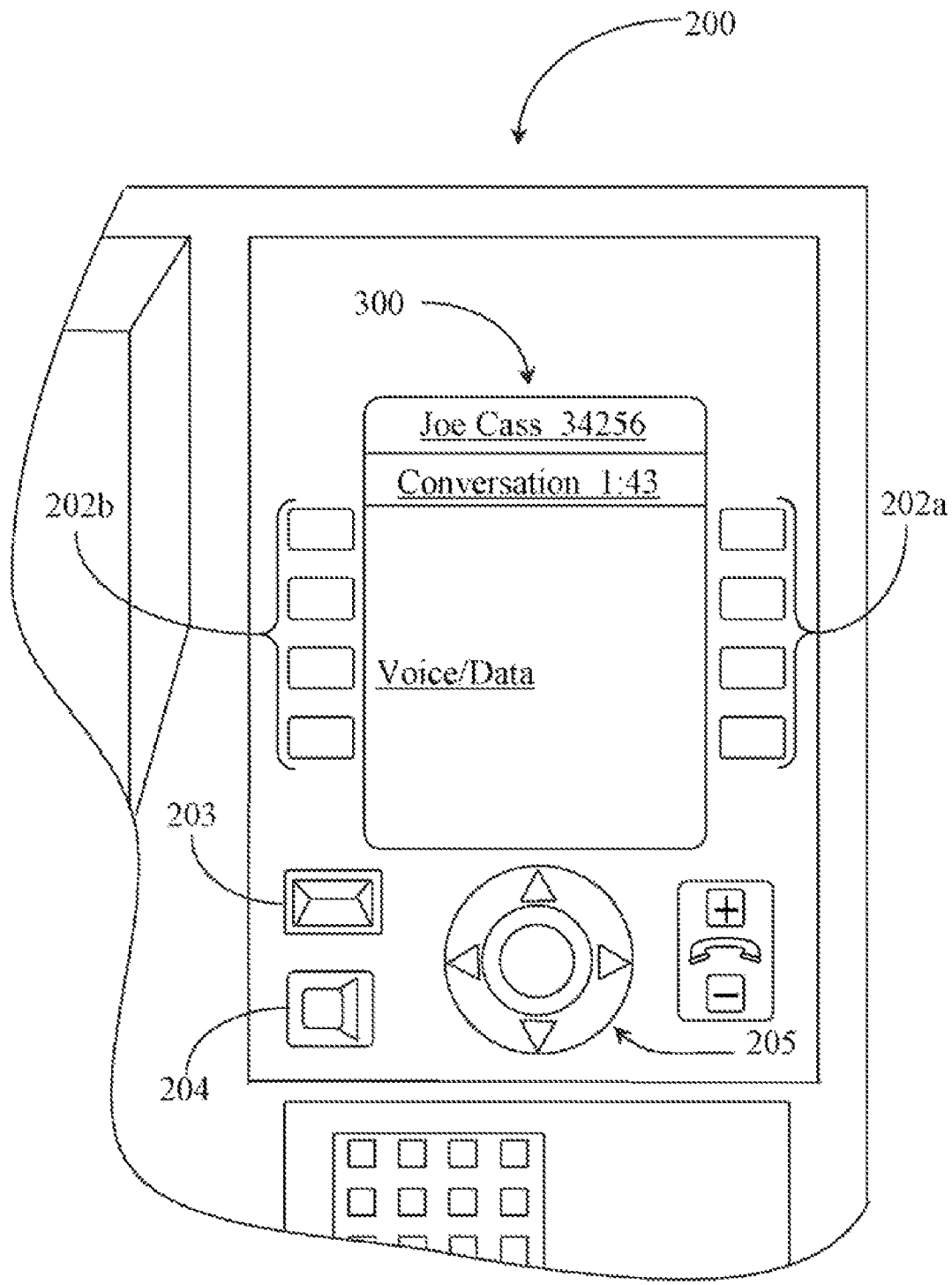
FIG. 2 is a partial view of PBX telephone of FIG. 2 illustrating voice-to-voice/data session transition options according to an embodiment of the present invention.

FIG. 2 is a partial view of PBX telephone 200 illustrating voice-to-voice/data session transition options according to an embodiment of the present invention. PBX set 200 has a screen display 300 illustrating that a user has selected a contact Joe Cass from the list of screen 201 of FIG. 2 above. Screen 300 also indicates that the operator is in a current voice session with Joe Cass as is indicated directly above mode button groupings 202a and 202b. In this case a conversation with Joe Cass has been in progress for 1 minute and 43 seconds 1:43.

In this example, mode buttons from grouping 202a and 202b may each have a specific assignment. In this example, button group 202b includes a voice/data button for triggering a call escalation.

The voice/data option enables the current voice call to be transferred to a conference bridge host and enables subsequent establishment of a second data share or collaboration connection (also hosted at the conference bridge) between the PCs or other designated computing devices of the parties. In a preferred embodiment, the transition is accomplished simply by depressing the mode button "Voice/Data" at any time during the active voice session. This option is available through PBX set interaction and no other tasks are required by the operator to initiate the session other than to depress the voice/data mode button once anytime during the active voice-only call.

In another embodiment of the present invention, the functionality afforded to PBX set 200 of FIG. 1 may instead be provided to the operator in the form of a user interactive screen displayed on a computer station connected to the LAN.

Figure 3:
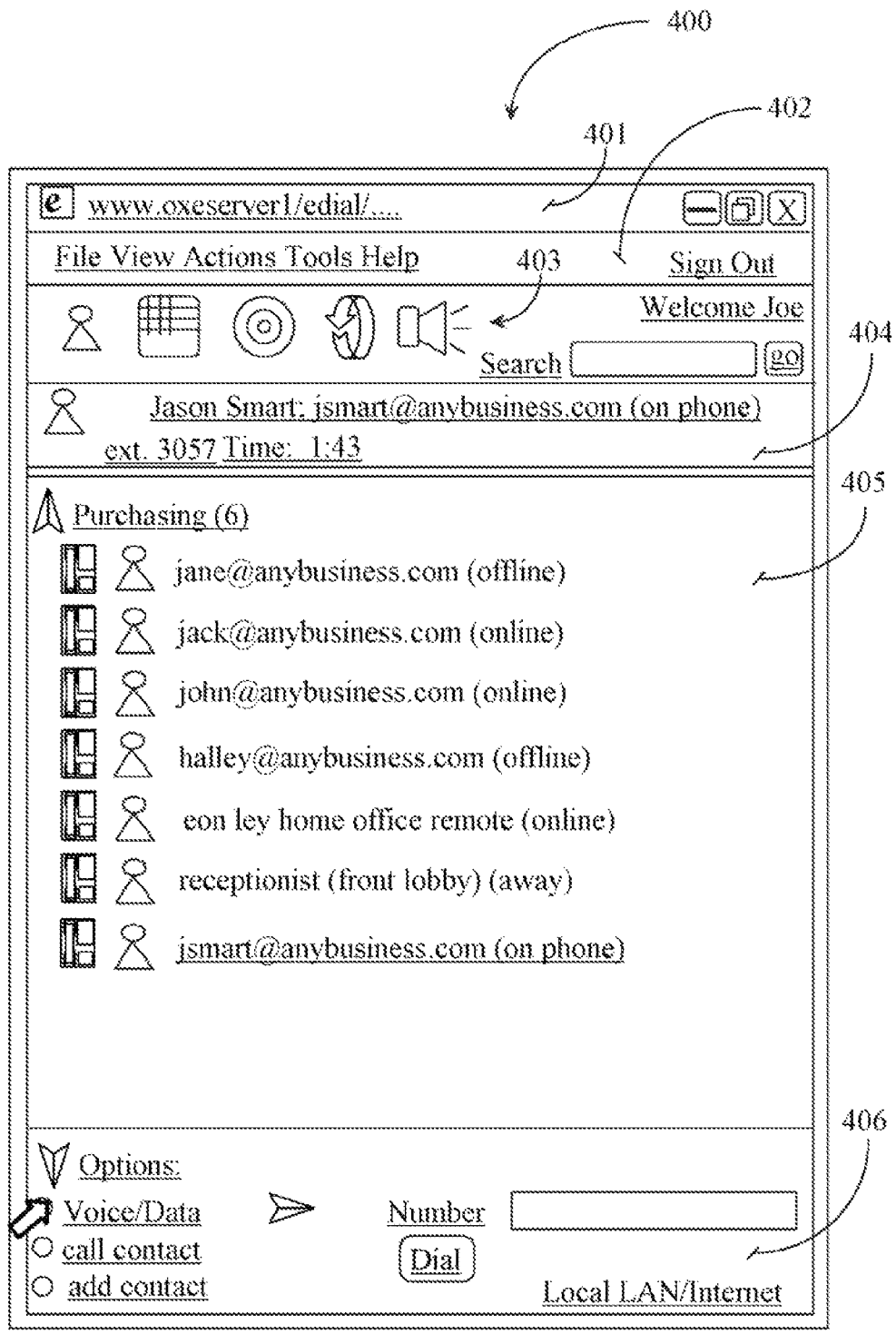
FIG. 3 is an exemplary screen shot of a client interface enabling call transition from a voice only call to a voice/data session according to an embodiment of the present invention.

FIG. 3 is an exemplary screen shot 400 of a client interface enabling call transition from a voice only call to a voice/data session according to an embodiment of the present invention. Screen 400 may display on an appropriate video display unit (VDU), a GUI including screen 400 for initiating voice calls and other tasks related to communication. Interactive screen 400 includes a title bar 401 illustrating that, in this case, the screen is browser-based. In this case, the user does not require a dedicated client software application to practice the present invention. Screen 402 also includes a tool bar 402, which is typical of any browser-based or browser-accessed interfaces. A sign out option indicates that the current user is signed in to a telephony server "oxeserver". A collection or grouping of interactive icons 403 are provided that enable various standard functions such as invoking contacts listings, invoking a scheduler or calendar, adding a link, refreshing a served page, and muting or un-muting audio. A standard search interface is also provided as may be standard with many browser-based or browser-served applications.

Screen 400 includes an activity bar 404 indicating that there is a current voice session in progress between the user and a contact from a list of purchasing contacts displayed in a workspace window 405. In this example, Jason Smart; jsmart@anybusiness.com has been selected and called using an associated PBX speaker set, the call actually initiated by the associated PC/GUI. Presence status for Jason indicates that he is on the phone. Activity bar 404 indicates that the session has been active for time 1:43, which could mean 1 minute and 43 seconds.

An options window 406 is provided within screen 400 and is adapted to list interactive options, similar to features described with respect to PBX set 200 described further above. In this case, options include an interactive option for transitioning the voice-only call currently active to a voice and data session hosted within a conference bridge. Other standard options listed include one for manually calling a contact accompanied by a number or extension entry field and dial command button. An option is also illustrated for adding a new contact. It is noted herein that screen 400 may contain more or fewer interactive options for performing certain tasks that are illustrated in this embodiment. The inventor intends that screen 400 represent just one example of a possible PC-displayed interactive interface that may be provided for initiating commands that direct PBX speaker set functionality. It is noted that a mouse arrow icon is illustrated over the option "Voice/Data" indicating user intent to transition the current voice-only session to a voice/data session hosted in a conference bridge.

Figure 4A:
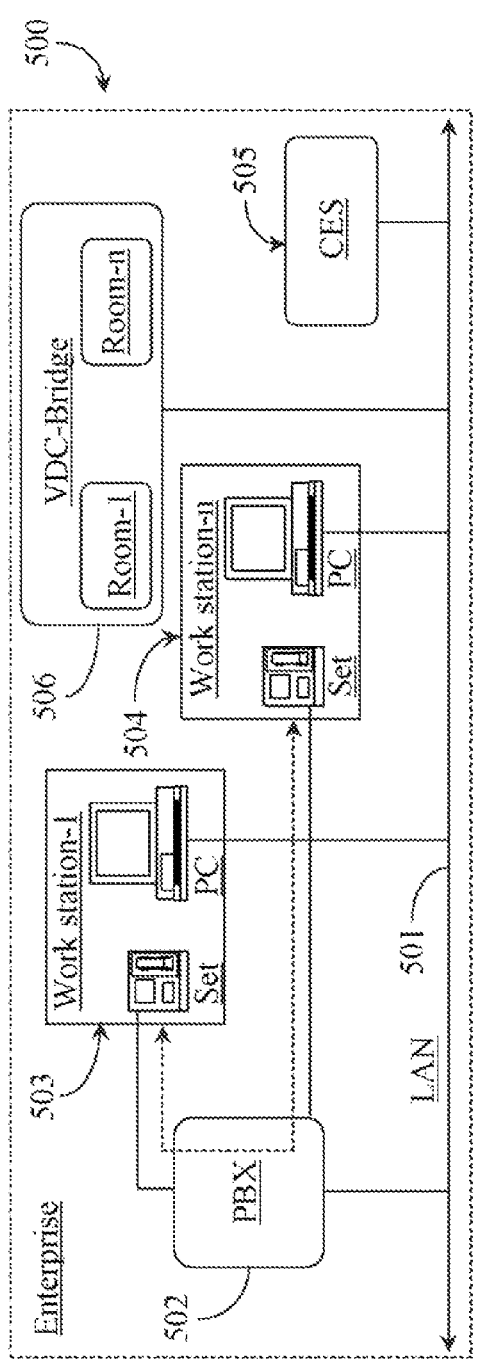
FIG. 4A is an architectural overview of an enterprise hosting a PBX-based voice only call before transition to a voice/data session.

FIG. 4A is an architectural overview of an enterprise 500 hosting a PBX state of a voice only call before transition to a voice/data session.

Figure 4B:
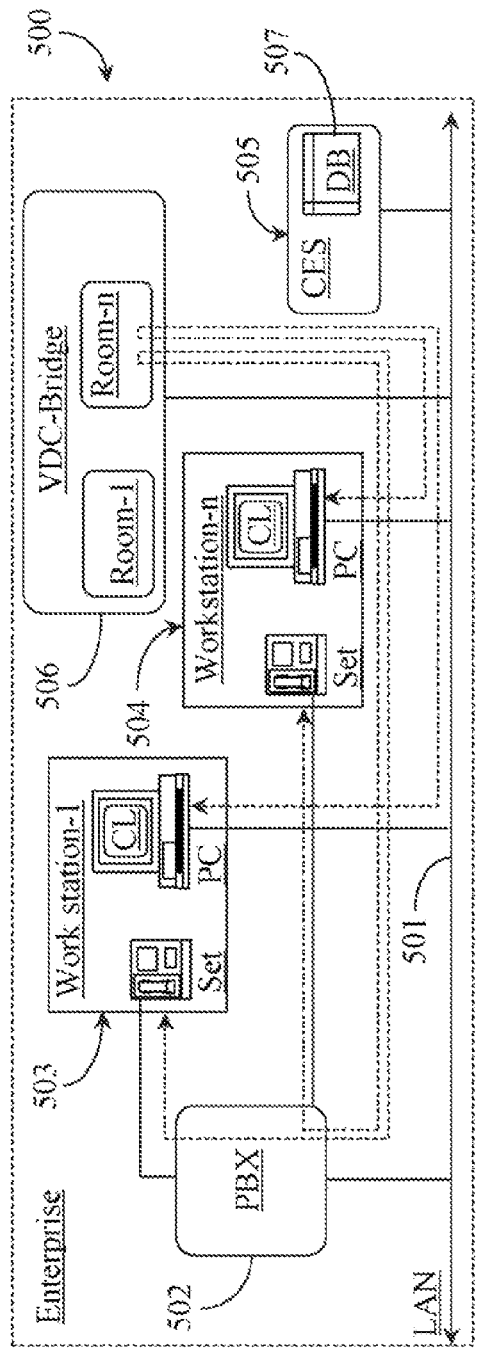
FIG. 4B is the architectural overview of the enterprise of FIG. 4A hosting transition of the voice call of FIG. 4A to a voice/data session according to an embodiment of the present invention.

FIG. 4B is the architectural overview of enterprise 500 hosting transition of the voice call of FIG. 4A to a voice/data session according to an embodiment of the present invention.

Referring now to FIG. 4A, enterprise 500 includes a LAN network 501, which in a preferred embodiment is adapted according to prevalent Internet protocols and communication capability. However, in this example, Internet communication capability is not specifically required in order to practice the present invention internally for users connected to LAN 501.

LAN 501 has a PBX switch 502 logically connected thereto for illustrative purposes only. It may be assumed in this example that PBX switch 502 is CTI-enhanced. A work station 503 (work station-1) is illustrated within enterprise 500 and is also connected to LAN 501 via PC-to-LAN connection. Work station 503 includes a LAN-connected PC and a PBX telephone set as is indicated by illustrated icons. A work station 504 (work station-n) is illustrated within enterprise 500 and is connected to LAN 501 in the same fashion described above with respect to work station 503. Work station 504 is, in this example, identically configured as station 503 including a LAN-connected PC and a PBX telephone set.

Additionally, LAN 501 supports a voice and data conference (VDC) bridge 506 adapted to support bridged communications between multiple parties using voice and other media interfaces. Within bridge 506, conference rooms 1 through n are illustrated. LAN 501 supports a call escalation system (CES) 505 through a direct LAN connection.

In this example, the call state indicates a normal and typical PBX voice call established between work station 503 and work station 504. The PBX sets at both stations each have a telephone wire, or other network connection to PBX switch 502 for voice communication. In this example, a voice call is in progress between the sets, the voice session established by and maintained in PBX 502 as is illustrated by broken line representing the bi-directional voice call in progress.

Referring now to FIG. 4B, the operator of work station 503 or the operator of work station 504 may initiate a transition from the current voice PBX call to a voice and data collaboration session hosted within VDC-bridge 506 by depressing a mode button on the PBX set, or by initiating the session via a similar action through a PC interface if available.

Assume that the operator of work station 504 escalates the current voice call. At the point of initiation, CES system 505 may be notified of the action via CTI-monitoring of the current voice call. In one embodiment, CTI software is resident in CES system 505 and is notified by PBX switch 502 of the state change with respect to the current voice session and more particularly, that one party has escalated the current session to a voice/data session. In an embodiment, wherein the PBX sets have direct LAN connection, then the action performed on the PBX set to initiate the state change is sent to CES 505 as a request to transition the call. In this embodiment, CES 505 then requests CTI call state information from PBX switch 502 in order to determine the identities of the session participants to retrieve, most importantly, the identity of the non-initiating party to the call. These identities are typically extension numbers and these extension numbers must also be linked to user identities and ultimately to the associated network addresses of each of the parties' PCs that will be used in the data collaboration portion of the new session. The linkage can be accomplished by the CES performing a database table lookup indexed by extension number. A database 507 is provided to CES 505 and is adapted to contain a table or list of PBX extension numbers and user names that may be associated with those extension numbers. Furthermore, the user name data may include associations to address information relevant to other nodes that a particular user communicates from or shares data from. A PC network address would exemplify a tuple that may be associated with a user and a PBX extension. Through a facility such as 507, CES 505 may perform a table lookup to associate a PC address with a PBX for the purpose of locating nodes that will be used to collaborate during a VDC session.

VDC-bridge 506 is, in a preferred embodiment, adapted to set up the various call legs to the PBX parties PBX sets and to their respective PCs according to a CES issued API call. Bridge 506 leverages PBX 502 through CES/CTI function to establish a call connected state between a conference room within bridge 506, room-n in this case, and one of the PBX sets involved in the voice call while the voice call is still active. The VDC-bridge 506 then, through CES and CTI function establishes a PBX call-connected state between the other party and room-n hosting and maintaining the connection in room-n. CES 505 then, through CTI command, instructs PBX 502 to drop the original legs of the original voice call that are no longer needed. Now the participants are connected in a voice session hosted within room-n of the bridge. A broken line illustrating a bi-directional voice connection between the PBX sets through PBX 502 illustrates the new voice path of the voice/data conference session being established.

CES 505 also sends an application program interface (API) command to VDC-bridge 506 to set up the data connection between the identified PCs of the parties. This may be a function of the first API call resulting from activation of a trigger escalating a voice call. In this case, pop-up screens, identified herein as client screens (CL) on each system appear when the connection is formed. The participants may now begin sharing and collaborating using their computers, the network connection also hosted within room-n and linked also to the voice portion of the conference session. The broken communication line connecting the 2 PCs through the conference bridge illustrates this.

Now, in FIG. 4B both parties are in a voice/data conference session hosted by and controllable from VDC-bridge 506. For example, any participant may now use his or her PC interface (CL) in order to initiate an invite to a third party having a telephone. Such a third party may be yet another co-worker within the enterprise and connected to LAN 501, or the third party may be located externally from the enterprise. All that is required to invite a third party into the voice/data session hosted in room-n of bridge 506 is knowledge of that parties' telephone number or directory name.

Figure 5A:
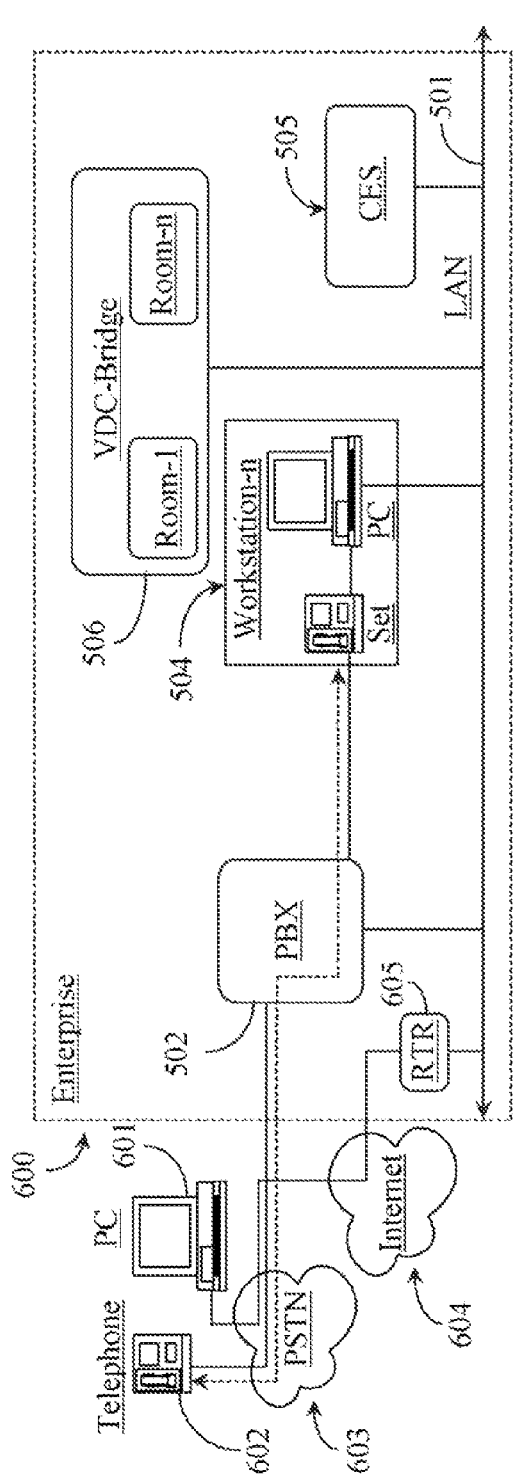
FIG. 5A is an architectural overview of an enterprise hosting a PBX-based voice call between an internal and an external party before transition to a voice/data conference session.

FIG. 5A is an architectural overview of an enterprise 600 hosting a PBX state of a voice call between an internal and an external party before transition to a voice/data conference session.

Figure 5B:
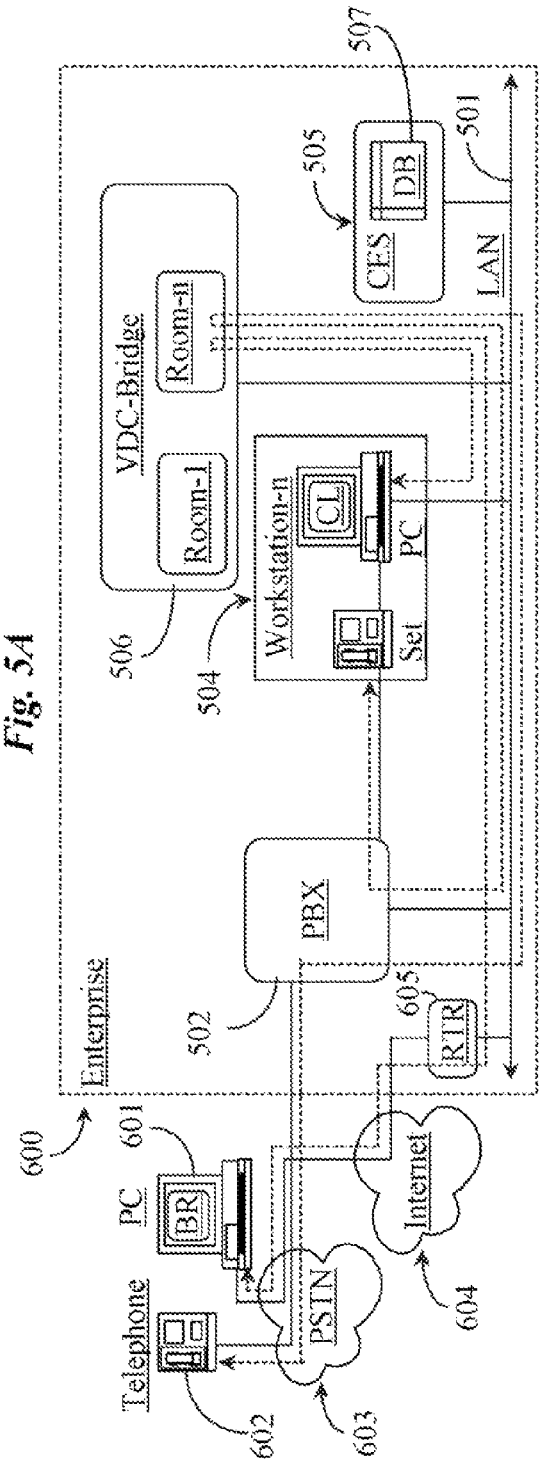
FIG. 5B is an architectural overview of the enterprise of FIG. 5A hosting transition of the voice data call of FIG. 6A into a voice/data session according to an embodiment of the present invention.

FIG. 5B is an architectural overview of enterprise 600 hosting transition of the voice data call of FIG. 5A into a voice/data session according to an embodiment of the present invention.

Referring now to FIG. 5A, enterprise 600, which may be a call center, may be assumed analogous to enterprise 500 described above, with the exception that PBX system 502 is now hosting a voice call between a PBX set within the enterprise and a PSTN-based telephone outside of the enterprise domain. This embodiment may be advantageous to a call center environment. In this case, a user may be presumed in control of a PC 601 and a PSTN telephone 602 as CPE equipment, perhaps located in a home office or anywhere outside of the enterprise reach in terms of LAN or PBX connectivity. The user may initiate a telephone call to the enterprise, which may be routed to the PBX set of a user at work station 504. Alternatively, it might be the user of work station 504 that initiates the voice call using his or her PBX set. In any case, the voice call is established via PBX 502 with one leg from PBX 502 to the PBX set of work station 504 over internal wiring or network, and the other leg routed through PSTN network equipment to PSTN 602 as a COST leg.

PC 601, in this example, has access to an Internet network 604, in one case through a high speed broadband network connection. It will be appreciated by one with skill in the art that other external party-access configurations are also possible without departing from the spirit and scope of the present invention. It will also be appreciated that the physical networks illustrated in this example such as Internet 604 and PSTN 603 share many of the same physical lines and space such that ambiguity exists with regards to exact boundaries between them in actual practice. Moreover, cable networks also offer Internet access and wireless networks may also offer Internet access. Therefore the illustration of separate network clouds should be regarded as exemplary and logical only and should not be construed as definitive of any exact network links or participation.

In this case, a router (RTR) 605 is illustrated as connected to LAN 501 and is adapted to enable connectivity of LAN 501 to Internet network 604 making LAN 501a sub-network of the Internet. In this present example, a bi-directional voice call is active between the operator of station 504 using a PBX set and a user operating telephone 602.

Referring now to FIG. 5B, a user at station 504 may initiate transition of the voice call of FIG. 5A to a voice/data session just as was described with reference to FIG. 4B above by simply pressing a mode button on the PBX set to transition the call or via the PC/GUI. It is important to note herein that only the enterprise user of station 504 can initiate the state transition of the voice call in this embodiment.

Initiating the command from the PBX set of station 504 causes a process similar to that described in FIG. 4B further above. CES system 505 receives a request as a result of an escalation (voice only-to-voice/data) action performed on the PBX set to set up a voice data conference between the involved parties to the currently active voice call. CES 505 may automatically, in one embodiment, receive CTI state information from PBX 502 if it is continuously monitored, or in the case of direct LAN/PBX set connection, may receive the request over LAN 501, and then may request CTI-state of the call based on the identity of the requester. In this example, CTI state identifies both parties, but may only provide a PC identification reference associated with the enterprise station 504, which is already LAN-connected and online. The PC identification and state information of the PSTN user may not be known to the system in this example.

In this embodiment the session is between an Internet PBX user and an external PSTN user, therefore CES may issue a first CTI command to cause a transfer of the call leg to the external party to VDC bridge 506. CES 505 may still perform a lookup in database 507 to associate the PBX extension and user name of the internal party. Such information would likely not be available regarding the external party. In one embodiment user name and PC network address data relevant to an external party to the call may be solicited at the time of routing of the call if the external party is the caller as might be common in a call center environment. Once the call leg to the external party is transferred from the PBX host to the VDC-bridge room-n (new host), CES issues an API command to VDC-Bridge 506 that causes a screen pop to be sent to the PC of work station n and a telephone call to the PBX set of work station n. CES 505 then issues a CTI command to PBX 502 to answer the new call and to drop the old call once the new call has been answered at work station n.

In this example, VDC-bridge cannot call PC 601 because it does not know the identity or state of the PC. Therefore, instead of attempting to establish a link to PC 601 of the external party, when the operator of PSTN telephone 602 picks up the session call from the PBX switch, a voice prompt, email, instant message or other form of communication may be provided to inform the user that he or she has been invited or requested to join a data collaboration session and that identifies a particular universal resource locator (URL) for the user to enter in his or her PC network browser application (BR) running on PC 601 while connected to the Internet. In this way, the user may enter the data portion of the session alongside the voice portion. Once the external party has entered data collaboration, it is possible that he or she can add a new participant to the session just as it is possible for the enterprise party to add new users to the conference. Optionally, the ability to add, drop and control other legs might also be provided only to a single party, such as the call initiator. The individual legs of the data connection and of the voice connection also exhibit manipulability in that through a PC interface, any user may, if authorized, be given full control of all conference legs or a portion thereof. In a typical use embodiment a voice prompt telling the external party how to connect to the data collaboration portion of the session would be sent to telephone 602 from the operator of the PBX set of work station 504, however this is not a limitation as it is technically feasible to originate a voice prompt from another node or automated system. Such a prompt might be as simple as "John can you please browse to trial.edial.com/call/0129456. A password might also be provided if required.

Figure 6:
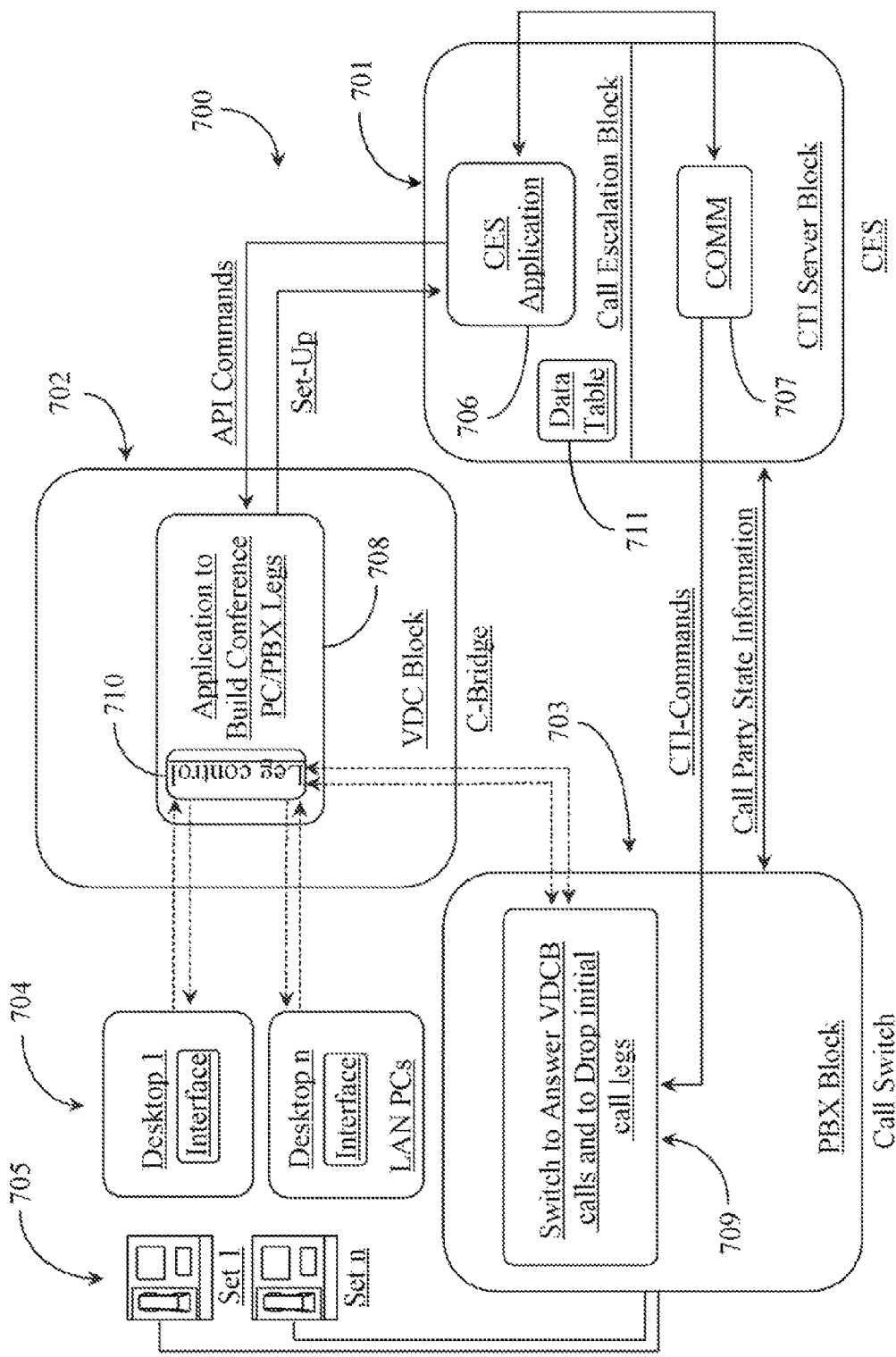
FIG. 6 is a block diagram illustrating component interrelationships during call state transition from a voice-only call to a voice/data conference according to another embodiment of the present invention.

FIG. 6 is a block diagram 700 illustrating component inter-relationships during call state transition from a voice-only call to a voice/data call according to another embodiment of the present invention. Diagram 700 includes a block 701, which is adapted, in this example, to provide both CTI command function and monitoring, and to provide VDC API command capability. That is to say that in this case, the CTI command software COMM 707 and a CES application 706 are resident on a single piece of hardware. A PBX block 703 represents the PBX switching capabilities related to answering calls and dropping call legs as required for transitioning host location, and a VDC block represents the conference host facility including an application 708 for defining and building the required conference PC/PBX legs.

Also represented by a block 704 are a desktop 1 with a working VDC interface, and a desktop n with a like VDC interface. LAN PCs 704 are associated with PBX sets 705, including PBX set 1 associated with desktop PC 1 and PBX n associated with desktop n. PBX sets 1 and n are connected to PBX 703 for communication.

When a user initiates a command to transition a voice call to a voice/data conference session, PBX block 703 recognizes the command aided by CTI monitoring. Call party state monitoring can be used to obtain PBX extensions but can not provide of itself user names or the associated PC addresses for data collaboration. More than CTI function is required to associate PBX extensions to users and their PC addresses. Therefore, a data table 711 is provided to CES application 706 as the result of a database lookup. Table 711 may be a table served by database 507 described further above.

CES application 706 issues a request to application 708 in VDC block 702 to build the required connections for transitioning the existing voice call from the PBX host to VDC-bridge 702. In one embodiment, VDC application 708 performs a set up sequence by responding back through block 701, more particularly through CES application 706, which has a command line connection to CTI server block COMM 707. In this case all CTI commands to PBX 703 may be issued through CES 701. The command sequence is relevant to the call state information known about the voice call in progress. PBX 703 calls set 1 and set n, and calls the bridge for each set effectively transferring call control of the voice session to the bridge itself. CES application 706 issues API commands to application 708 to cause the data connection between desktop 1 and desktop n to be established by the bridge calling each PC and pushing the interface to those PCs. Conference room 710 now hosts the entire session, voice and data. Within the data collaboration session, user may be able to exchange text, upload documents to one another, deliver a presentation, share screens, and the like, as well as to be able to control the call itself through the PC interfaces. Moreover, any future legs may be set up accordingly for both additional voice connections using CTI instruction to PBX 703. CES application 706 is bypassed when setting up new data connections because the new point of control is room 710.

It will be apparent to one with skill in the art of CTI-enhancements used in telephony in general that actual CTI server software may be installed and operational in virtually any node that has access to both the VDC-bridge and to the PBX switch. Also, CTI software may be integrated on the conference bridge facility itself, or within the PBX switch itself without departing from the spirit and scope of the present invention. The CES sequence template or templates and the provided CTI-command capability are key to success of the present invention. In one embodiment, all of the described capabilities, CES, CTI, and VDC, may well be provided from and executed on a single powerful PBX switch. Such an embodiment will be described later in this specification.

Figure 7:
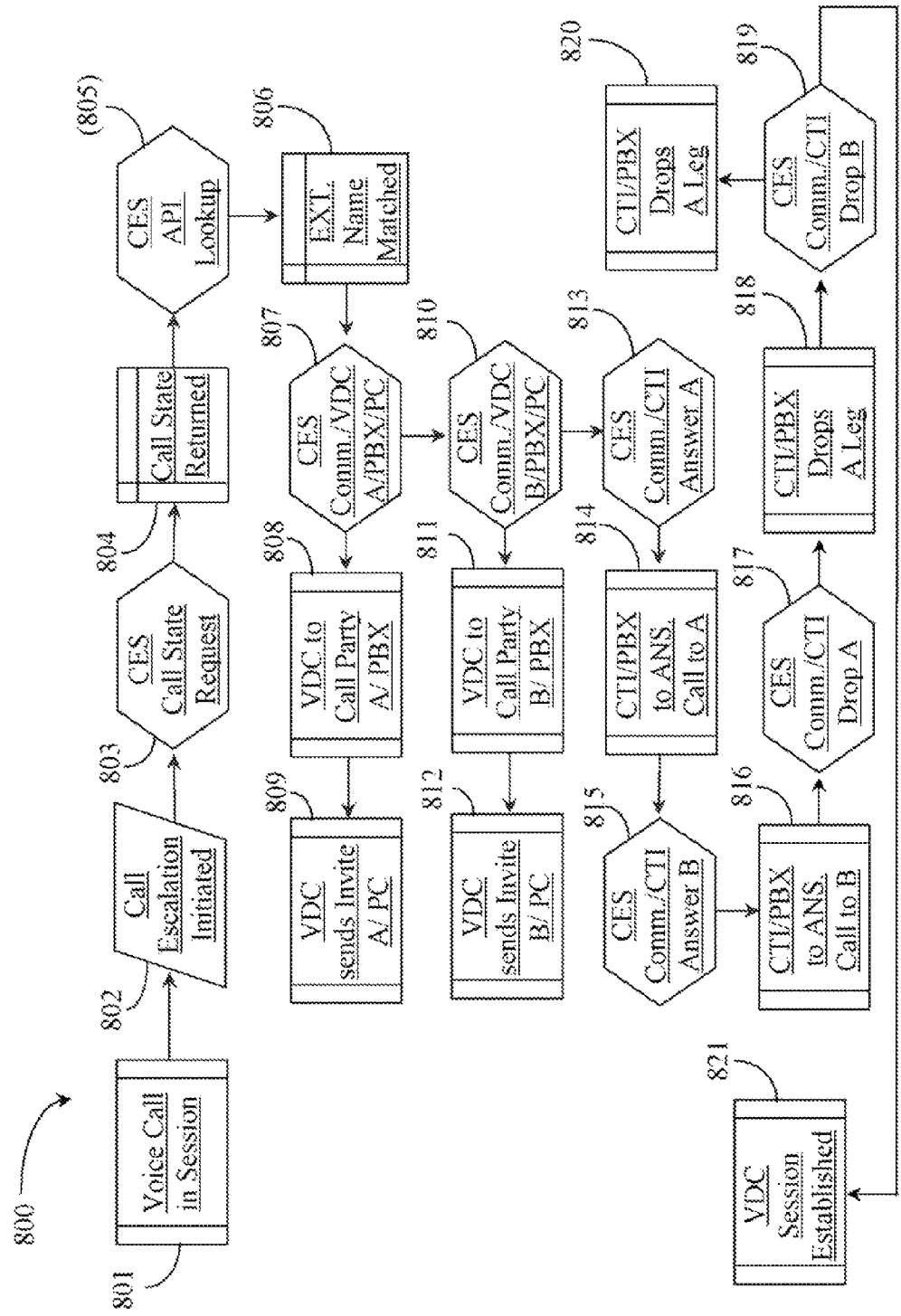
FIG. 7 is a process flow chart illustrating a sequence for initiating and establishing a PBX-to-PBX voice/data conference from an active voice-only call according to an embodiment of the present invention.

FIG. 7 is a process flow chart illustrating a sequence 800 for initiating and establishing a PBX-to-PBX voice/data conference from an active voice-only call according to an embodiment of the present invention. At act 801, a voice call is in an active state between the PBX sets hosted by a PBX switch. For the purposes of discussion the parties involved in the session may be referred to hereinafter as party A and party B. At act 802, a call escalation (voice only to voice/data) may be initiated. Act 802 may be performed from the interface of either PBX set involved in the call of act 801. Simply depressing a mode button dynamically or otherwise programmed for the purpose is sufficient to initiate the process sequence of events. In one embodiment, the call escalation request may be initiated from a PC logged into a VDC bridge.

At act 803, the request may be received by a call escalation system (software/hardware) connected to the LAN and CTI call state may be accessed to determine the complete call state information of the active voice call from which the request originated. In one embodiment, CTI-based call state monitoring of the PBX switch can detect whenever a party depresses a call escalation button from a PBX set and pass that information through a CTI link with the appropriate call state information associated with the request without taxing normal LAN traffic.

At act 804, the CTI state information is returned to the CES application after it is requested at act 803. The call state returned typically includes only the PBX extensions of the sets involved with the call. At act 805, the CES application may execute an API command to perform a database lookup in order to associate the PBX extensions of the call in session to the user names of those extensions and further to other associated information such as PC network address information. At act 806, the CES application associates the extensions to names and thereby may obtain further information associated with the users. At act 807, the CES application issues an API command to call party A of the voice only PBX session to connect party A to the VDC bridge and to send party A an invite or screen pop party A's PC for the purpose of entering a VDC conference room for data collaboration. In this case party A may be the party requesting the conference session. It is noted herein that in actual practice, that one half of the PBX connection state between the parties includes a leg between the PBX and the bridge and a leg between the PBX and the PBX set.

At act 808, the VDC bridge calls party A PBX and at act 809 an invite or screen pop is sent to party A's PC. At act 810, the CES issues an API command to the VDC bridge to call party B at the PBX and to send an invite or screen pop to the party's PC. At act 811 then the VDC bridge calls party B and sends an invite to the PC of the called party at act 812. It is important to note herein that acts 807 and 810 may comprise the issuance of a single command to the VDC bridge without departing from the spirit and scope of the present invention. The CES application, as a result of act 806 has all of the required information in this example to issue a single command that the VCD bridge performs as described in acts 808, 809, 811, and 812. It is also important to note herein that no particular sequence of acts is specifically required in order to effect the VDC bridge as the new session host. For example, a screen pop may arrive before or after a PBX call leg is transferred from the PBX to the bridge. At act 813, the CES application sends a CTI command to the PBX switch to answer the call placed to party A by the VDC bridge at act 808. At act 814 the PBX answers the call to party A finishing one half of the voice connection. At act 815, the CES application issues a CTI command to the PBX to answer the call placed to party B by the VDC bridge. At act 816 the PBX responds and answers the call to party B. At this point, in one aspect, the VDC voice/data session may be considered established except that the old PBX call legs are still in place and must be dropped. The PC calls from the bridge to the respective PCs were actually established during setup because the PBX switch did not have to be involved in establishing the data collaboration channel between the parties. At any time, the parties may begin data collaboration.

The above-described example may assume that both PBX parties A and B have PCs that are powered on and are logged into the VDC bridge in standby or in a monitoring state. However this is not specifically required in order to practice the present invention. The respective PCs may be powered on and connected to a LAN network, but not specifically logged into the VDC bridge. In this case they may subsequently login and receive the screen pops perform data collaboration.

At act 817, the CES application sends a CTI command request received at the CTI server to drop the original PBX call leg to party A, which was the original call leg in place at act 801. At act 818, the PBX receives the command from the CTI server and drops the call. At act 819, the CES application sends a second CTI command request to the CTI server to drop the original PBX call leg to party B, which was the original call of act 801. The PBX drops the call to party B at act 820. At act 821 the voice/data conference session is now completely established and the old connections have been torn down.

One skilled in the art of CTI-communications will appreciate that the process flow described by the included acts may be augmented with variant acts and may vary the acts order of execution without departing from the spirit and scope of the present invention. The exact order and description of individual acts may depend partly on architecture and on end user devices and location with reference to the hosting network. In this example, the call escalation system (CES) issues commands to various other systems in a runtime embodiment and those systems carry out the commands at the time of receipt of those commands. In actual practice of the invention the complete sequence executes and is carried out in manner comparative to any runtime routing routine. Moreover multiple acts illustrated as executed in sequence may be ordered from a single CES application command issuance without departing from the spirit or scope of the present invention. Likewise, multiple commands may be issued in sequence.

Figure 8:
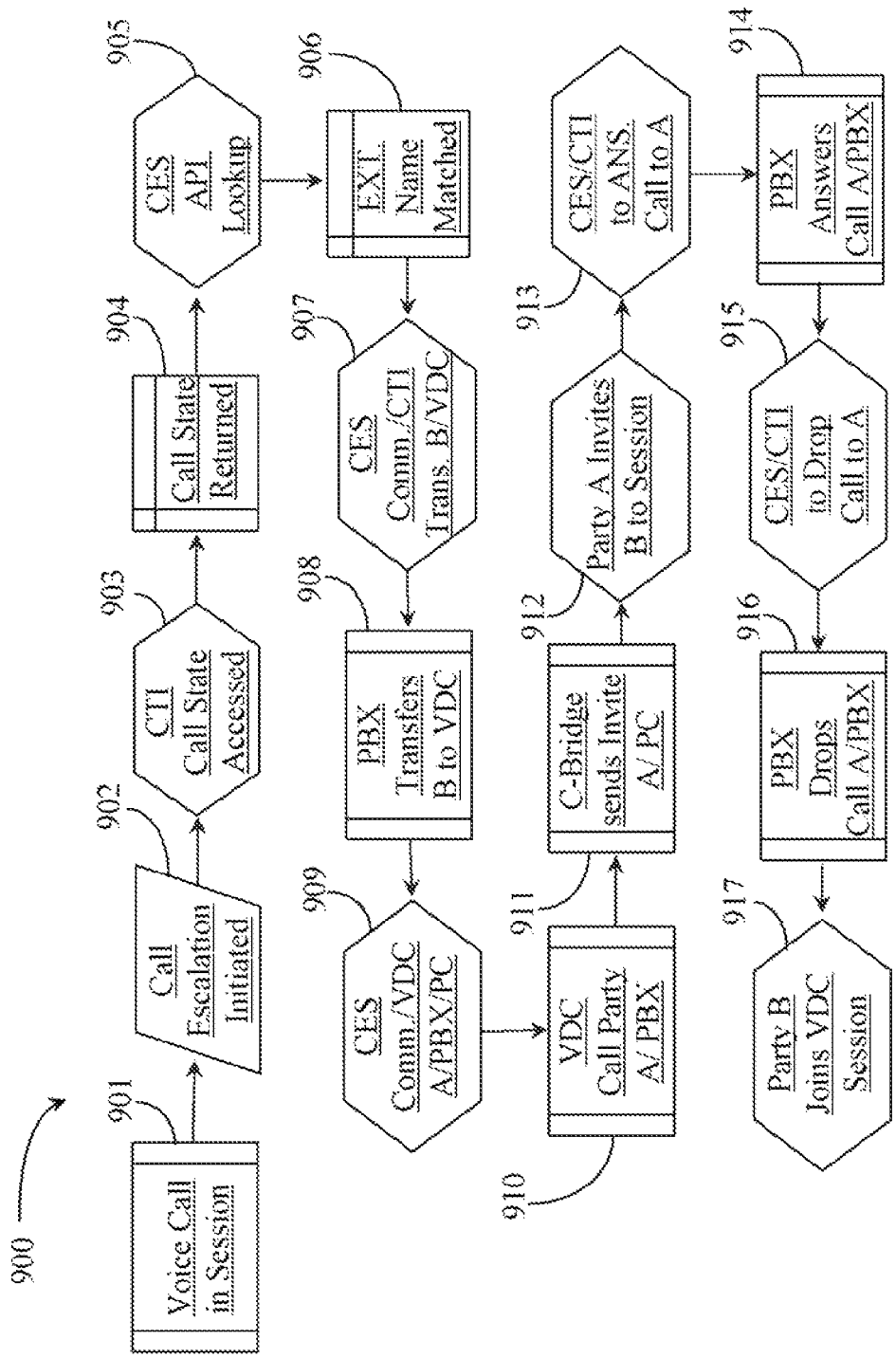
FIG. 8 is a process flow chart illustrating a sequence for initiating and establishing a PBX-to-PSTN voice/data conference from an active voice-only call according to an embodiment of the present invention.

FIG. 8 is a process flow chart illustrating a sequence 900 for initiating and establishing a PBX-to-PSTN voice/data conference from an active voice-only call according to an embodiment of the present invention. At act 901, a voice call has been established and is currently in session. Unlike the example of FIG. 7 above, a PBX caller placing a telephone call to a PSTN telephone typifies the call of act 901. In this example, the reverse order may also be the case where a PSTN caller places the call to a PBX telephone. At act 902, a call escalation sequence from a voice only telephone call to a voice/data conference session is initiated. In this act, only the PBX telephone party may initiate the escalation.

At act 903, CTI call state is accessed by the CES application of the present invention. This act assumes that the PBX telephone has a direct LAN connection and the physical act of initiation call escalation at act 902 results in a request to the CES system over IP LAN to proceed with the request. However, in one embodiment, the CTI call state of the parties involved in the call may be acquired through active CTI monitoring of the PBX switch. The state would be available at the time of CTI detection of the CES action performed at the PBX telephone interface. It is also noted herein that in one embodiment, act 902 may be performed at a PC/VDU by interaction with a running GUI.

At act 904, the CTI call state including both caller and called party parameters is returned to the CES application. For the purpose of this specification the PSTN party may be referred to herein as party B and the PBX party may be referred to herein as party A. At act 905 the CES application may issue an API command to perform a database lookup in order to associate user names to call parameters, namely PBX extension or other caller ID. At act 906 the CES application matches PBX extension with user name and therein may also obtain additional information that may be associated with a user name such as PC network address information. It is noted herein that the PSTN party may not be identifiable through a lookup to a PBX extension or a user name. Therefore, act 906 may only reveal the user name and other data associated with the internal PBX extension. However, this is not to imply any limitation as it may be a practice, especially in call center environments, to associate customer PSTN numbers to other information about the customers including customer name maintained in a database. Therefore, it is possible that the CES application may obtain PC network address or other ID including name from the knowledge of an external telephone number of a calling or called party.

At act 907, the CES application issues a CTI command to the PBX to transfer the PSTN party, or party B, to the VDC-bridge. At act 908, the PBX transfers party B to the VDC bridge. At act 909, the CES application issues an API command to the VDC bridge to call the PBX party (party A) and to send an invite or a screen pop to the PC of party A to join a conference room for data collaboration. At act 910, the VDC bridge call party A and in act 911 sends a screen pop or invite to party A's PC. Once party A has a voice connection to party B and is connected in a conference room, party A may invite party B to the data collaboration session at act 912. This may simply be voiced to party B by party A whereby party A tells party B how to navigate to the session using the PC. Party A may also inform Party B of the specific URL for data collaboration via an email, instant method or other means.

At act 913, the CES application sends a CTI command, to answer the call placed to PBX party A. At act 914, the PBX switch under control of the CTI server answers the call to party A. At act 915, the CES application sends a CTI command to the PBX to drop the original call leg to A associated with the voice only call session of act 901. At act 916, the PBX switch executes the command and drops the call leg.

At act 917, if Party B (PSTN party) has not already done so, Party B may join the VDC data collaboration session by logging into the session according to the instructions given at act 912. In one embodiment, act 912 may be replaced by some other way to invite the PSTN party to the VDC data session such as sending a URL that the party may copy and paste into a browser navigation bar.

In one embodiment, party B may not necessarily be invited to join the data portion of the conference. If Party B does not receive and enter a URL there is still an important advantage in the PSTN transfer. The call has been seamlessly moved over from the PBX to the VDU. Party A having a PC/GUI can add other parties to this conference, control their legs etc. Party A could not have conveniently done this prior to the call escalation.

One skilled in the art of CTI communications will appreciate that there may be more or fewer acts included in sequence 900 without departing from the spirit and scope of the present invention. For example, in one embodiment wherein the PSTN party may be online and connected to the Internet network, it is possible in some embodiments, that the URL is received and automatically executed to cause client navigation to the VDC-bridge and thus entry into an active data collaboration session with party A. As long as one of the parties is CTI/PBX-enabled the voice/data session may be setup and established with hosting at the VDC-bridge.

Figure 9:
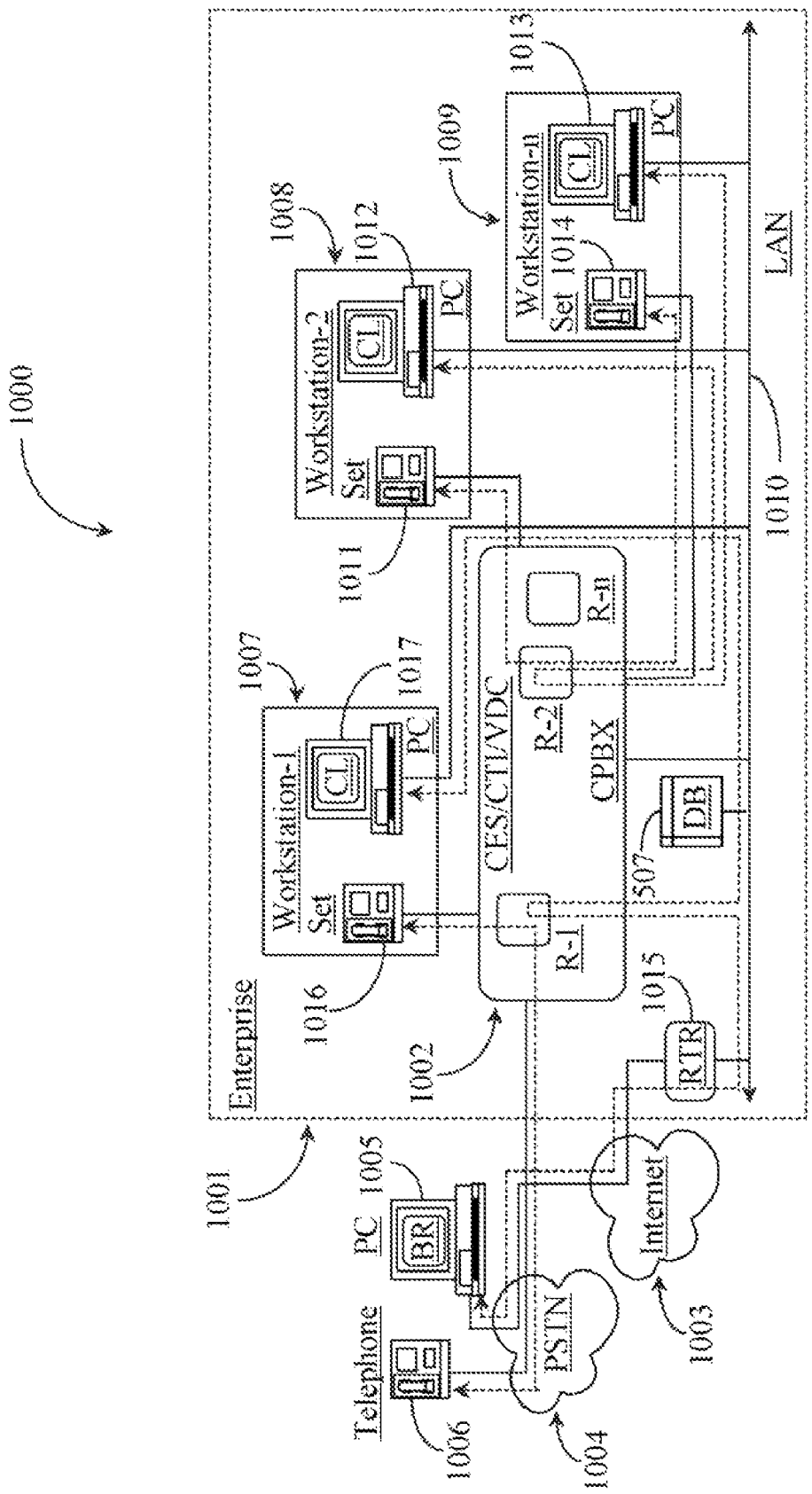
FIG. 9 is a simple architectural overview illustrating a combined CTI-enabled conference-capable PBX switch functioning according to one embodiment of the present invention.

FIG. 9 is a simple architectural overview 1000 illustrating a combined CTI-enabled conference-capable PBX switch 1002 functioning according to one embodiment of the present invention. An enterprise 1001 hosts a conference PBX (CPBX) 1002 in this embodiment. CPBX 1002 is a single unit that integrates PBX switch capability, a call escalation system (CES) application, CTI capability, and voice/data conference capability. CPBX 1002 is connected to a LAN 1010. Also connected to LAN 1010 within enterprise 1001 is a work station 1007 (work station-1), a work station 1008 (work station-2), and a work station 1009 (work station-n).

Work stations 1007-1009 are similarly equipped and include a PBX set 1016 and PC 1017 in station 1007, a PBX set 1011 and PC 1012 in station 1008, and a PBX set 1014 and PC 1013 in station 1009. In this example, PBX telephone sets 1016, 1011, and 1014 are connected to CPBX 1002. PC/VDUs 1017, 1012, and 1013 are directly connected to LAN 1010. CPBX 1002 has access to database (DB) 507, which is LAN based in this example. DB 507 may also be a storage system that is internal to CPBX 1002 without departing from the spirit and scope of the present invention. In this example, client (CL) software is illustrated On PC 1017 in work station 1007, on PC 1012 in work station 1008, and on PC 1013 in work station 1009. However, in one embodiment browser (BR) based VDC login may be practiced. In one embodiment, determination of which voice sessions established will escalate to a voice/data session may be subject to enterprise policy governed by one or more rules. In this case, certain users may be pre-defined for VDC bridge hosting such that for any established PBX session or PBX session request, the system determines if escalation is required by default. If so, then call escalation may be an automated routine. In this embodiment, a voice to data escalation may be ordered even if one party is an external PSTN party and not listed in internal data tables or lists. Still in another embodiment, even external PSTN parties may be considered equally with PBX clients if enough information about those parties is known to the system.

LAN 1010 supports a router (RTR) 1015 for routing data between LAN 1010 and any external network. In this example, enterprise 1001 has access to Internet network 1003. An external party station is illustrated in this example and includes a PSTN telephone 1006 and an associated PC/VDU 1005.

In this view, VDC conferences are hosted by CPBX 1002 in a room-1 (R-1) and in a room-2 (R-2). For example, PSTN telephone is engaged in a voice session with 1006 PBX set 1016 through the PSTN network and CPBX (R-1). Likewise, PC 1017 and PC 1005 are connected for data collaboration over LAN 1010, CPBX 1002, through RTR 1015 and Internet 1003. Work stations 1008 and 1009 are engaged in a separate voice/data conference session hosted by CPBX 1002 in room-2. For example, PBX set 1011 has a CPBX connection to PBX set 1014, and PC 1012 has a data collaboration connection to PC 1013 hosted by CPBX 1002 room-2.

It will be apparent to one with skill in the art that many smaller conferences may be set-up and established and hosted within CPBX 1002 using methods of the present invention. Some of these smaller conferences may be combined into larger conferences without departing from the spirit and scope of the present invention. For example, if two smaller conferences are established, wherein the subject matter of the conference and the aggregate of the participants suggests that the two may be merged, then a system invite may be sent to one of the conference rooms to join one of the other conference rooms. There are many possibilities. By combining all of the functions into one enhanced PBX switch, the methods of the invention may be executed more locally and with somewhat more efficiency.

The methods and apparatus of the present invention may be practiced in conjunction with the Internet or other WAN as a conduit between to LAN-based PBX systems without departing from the spirit and scope of the present invention. Virtual private network (VPN), IP tunneling, and other quality-of-service (QoS) utilities can be used to maximize session quality. The invention may also be practiced between a CTI/PBX system and an externally located PSTN system without departing from the spirit and scope of the present invention.

Figure 10:
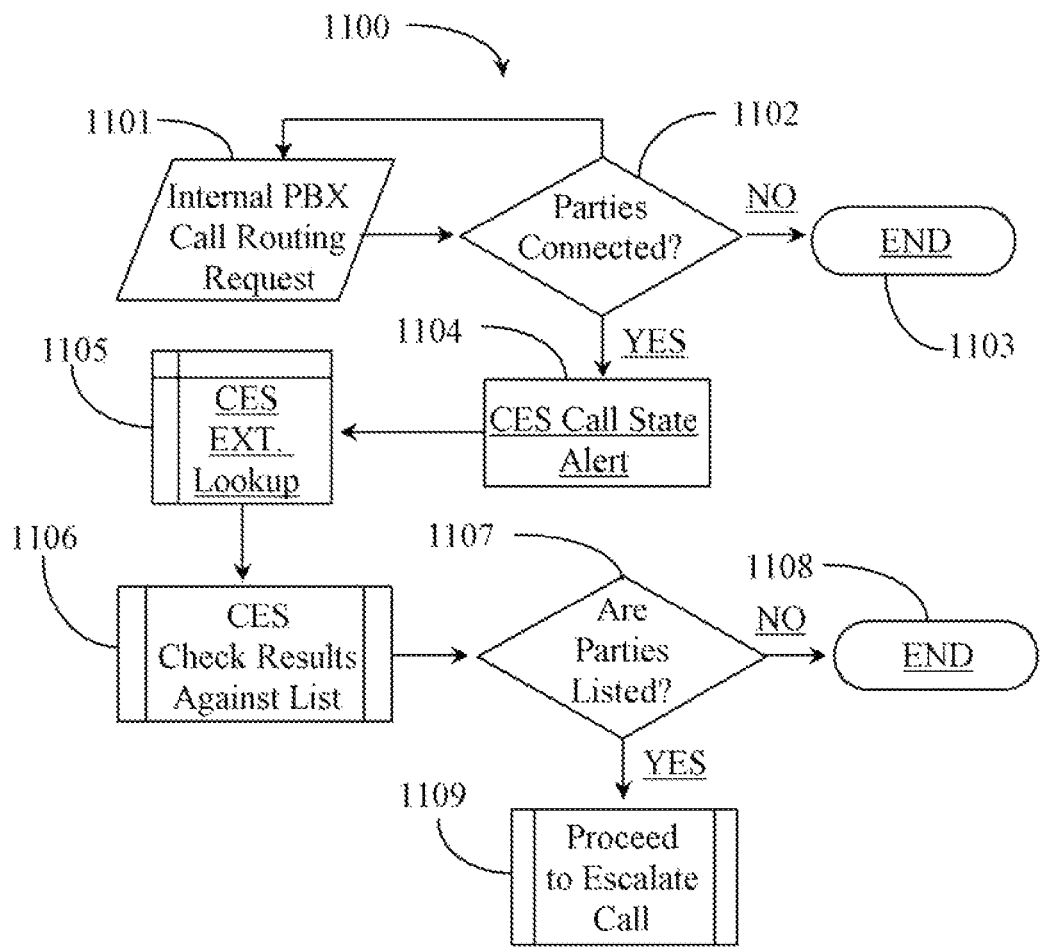
FIG. 10 is a process flow chart 1100 illustrating a routine for determining automated call escalation according to an embodiment of the present invention.

FIG. 10 is a process flow chart 1100 illustrating a routine for determining automated call escalation according to an embodiment of the present invention. Process 1100 may be integrated with call routing software and may run in parallel or in conjunction with the general processes described further above where manual call escalation is practiced.

At act 1101, the routing system of an enterprise, for example, receives a PBX call routing request to an internal PBX extension. The request may result from an incoming PSTN call from the PSTN network or from a PBX caller reaching the enterprise from a remote PBX system. Likewise, the request may be from an internal PBX caller. At act 1102, the routing routine determines if the connection is made to the final destination resulting in a voice call connected between the parties involved.

At act 1102 if the parties were not connected because of a current state such as busy or unavailable then the process may end for that request at act 1103. However, the routine may restart for a next routing request (1101), or the next stage of an existing routine for treating an original failed request such as re-direct or some other caller treatment. In this case, a next routine may be treated by default as a new request even though it is the same caller.

At act 1102 if the parties were successfully connected and are in a voice session, a call state alert may be forwarded to the CES system at act 1104 at the start time of the established session. At act 1105, the CES application may perform a table lookup to determine if one or more of the parties extensions in the voice session can be matched to a user name and possibly to other data associated with the user name such as a PC network address. At act 1106, the CES application may compare results returned as a result of act 1105 against a list of users that are pre-destined to receive automated voice to voice/data escalation treatment. The list may include one or more rules or constraints associated with the users identified.

At act 1107 the CES application may determine if any of the parties of the voice session are listed for auto call escalation treatment by default, or according to any consulted constraints. If not, the process may terminate at act 1108. This does not mean that call escalation cannot happen for that voice session. Any PBX party of the session may still manually escalate the call if it is desired. At act 1107 if it is determined that one or more of the parties in the established voice session is listed for auto call escalation treatment, then at act 1109, the CES application may proceed to escalate the call by performing the appropriate API and CTI commands required as described in the embodiments further above.

In one embodiment the methods of the invention may be practiced between to remote but similarly adapted PBX/VDC bridge systems connected to each other by wide area network (WAN). In this case, either PBX user may escalate the call to a voice/data session by simply depressing a mode button to issue the command. However, in this case the domain (PBX system) of escalation may determine which PBX/CES system will process the order and which VDC-bridge will actually host the conference session. In a variation to this embodiment, a specific VDC-bridge may be determined at the time of escalation and from the PBX set initiating the escalation.

It is known in the art of telephony that a PBX system may be maintained and hosted within a network whereby external users may access the system using a communication device enabled by software. In such an environment the actual PBX switch and data collaboration bridge of the system may be hosted by a third party providing the telephony and data share services to subscribing enterprises via IP. The call escalation system of the present invention may be incorporated as a feature of such a system as long as a mode for initiating the feature from a hand set may be recognized by the system and as long as a data conference room is adapted to host both the voice and data share portion of a voice/data session escalated from a voice only session.

Therefore, the present invention may be provided and may be successfully implemented using all of or some of the components described in this specification without departing from the spirit and scope of the present invention. The spirit and scope of the present invention should be limited only by the claims that follow.

What is claimed is:

1. A system for effecting transition of a private branch exchange (PBX) system-hosted voice only telephone session in progress into a new voice session enhanced with a data collaboration channel comprising:
    a call escalation system (CES) application for determining call state of the voice session to be transitioned and for executing a sequence of command requests for effecting the transition based on a trigger event provided by a participant in the voice only telephone session interacting with a PBX telephone used in the session;
    computer telephony integration (CTI) software executing in the CES application for controlling the PBX switch; and
    a conference bridge for hosting voice and data communications;
    wherein in response to the trigger event the voice only telephone session is transferred to the conference bridge and the data collaboration channel is an Internet connection linked to the voice session and the conference bridge hosts both the voice and data collaboration channel providing a single control interface to participating users for controlling the voice session and the data collaboration channel.

2. The system of claim 1, wherein the voice only telephone session is in progress between at least 2 PBX telephones at the time of transition.

3. The system of claim 1, wherein the voice only session is in progress between at least one PBX telephone and at least one system-external public-switched-telephone-system (PSTN) telephone at the time of transition.

4. The system of claim 1, wherein the voice only telephone session is in progress between at least 2 PBX telephones hosted by 2 separate PBX systems separated by a wide area network (WAN).

5. The system of claim 1, wherein the call state includes calling party identification and telephone number or equivalent and called party identification and telephone number or equivalent and time of progression of the current call.

6. The system of claim 5, wherein the call state further includes address information of a computing device connected to the Internet used by the PBX party for data collaboration, the address information determined via a table look up procedure.

7. The system of claim 1, wherein the CTI software includes a control application controlling the PBX system.

8. The system of claim 1, wherein the trigger event is one of an invocation of a user operable feature or an invocation of an automated feature.

9. A system for initiating a request to transfer a voice only telephone session from a PBX switch host to a voice and data conference bridge host having a software routine executing from computer-readable medium of a computerized node connected to both the PBX switch host and the data conference bridge host, comprising:

a mode button or icon generic to a PBX telephone set and;
a machine instruction;
wherein when a user participating in the telephone session interacts with the mode button or icon the machine instruction is initiated causing a request to transfer the voice only telephone session from a PBX switch host to a voice and data conference bridge host connected to the Internet and the conference bridge hosts both the voice and data collaboration channel providing a single control interface to participating users for controlling the voice session and the data collaboration channel.

10. The system of claim 9 embodied as a physical mode button on a PBX set and wherein the machine instruction is a CTI/PBX routine for generating a request.

11. The system of claim 9 embodied as an icon displayed on a screen of a PBX set and wherein the machine instruction is a CTI/PBX routine for generating a request.

12. The system of claim 9 embodied as an icon displayed on the associated computing device and wherein the machine instruction is a CES routine for generating a request.

13. The system of claim 9, wherein the voice only telephone session is in progress between at least 2 PBX telephones at the time of initiation and execution.

14. The m system of claim 9, wherein the voice only telephone session is in progress between at least one PBX telephone and at least one PSTN telephone at the time of initiation and execution.

15. The m system of claim 9, whereupon invocation, triggers a CTI to CES call, the call including a call state of the parties.

16. A method for triggering a request for transitioning a voice only telephone session to a voice and data conference session including acts for:

(a) establishing a voice-only telephone session between two PBX parties;
(b) interacting with a mode button on a PBX telephone set of a party in session;
(c) initiating a machine instruction as a result of step (b) causing a request to transfer the voice only telephone session from a PBX switch host to a voice and data conference bridge host connected to the Internet;
(d) creating the data conference session between the two parties via the conference bridge; and
(e) providing a single control interface at the conference bridge allowing the two parties to control both the voice session and the data conference session.

17. The method of claim 16, wherein in act (a), the voice only session is between a PBX party and a PSTN party.

18. The method of claim 16, wherein in act (b), the machine instruction is invoked by manipulating an icon displayed on a personal computer video display unit (PC/VDU) associated with a PBX set of a party in session.

19. The method of claim 16, wherein in act (b), the machine instruction is automatically invoked through a software routine as a matter of rules base.

* * * * *